Figure 1:
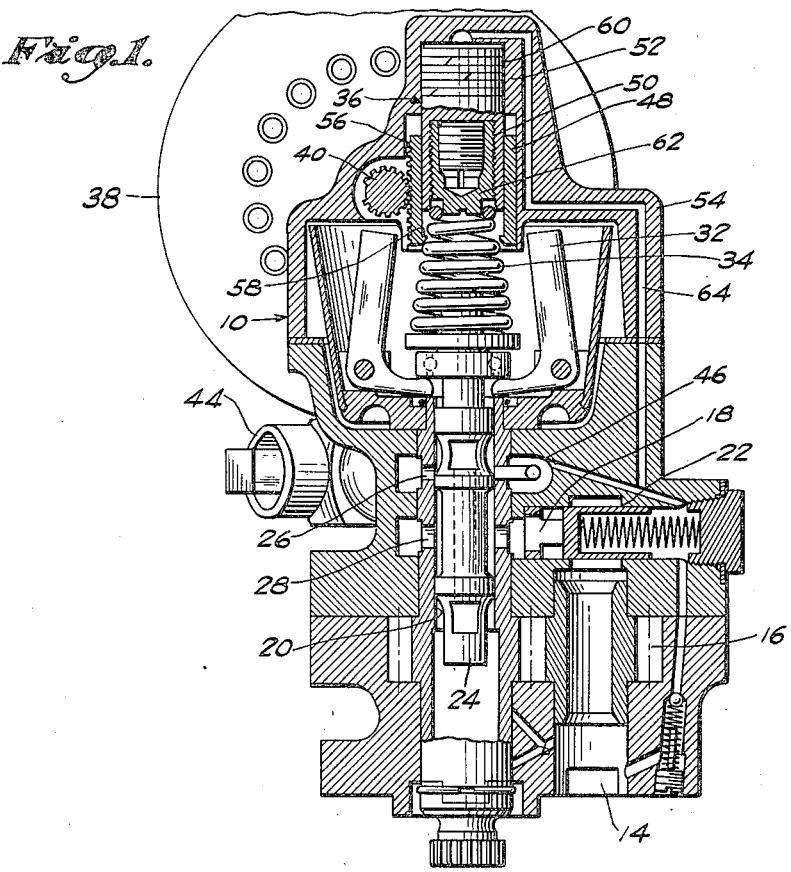

Jan. 17, 1950     N. R. RICHMOND     2,494,630
AUTOMATIC RESETTING DEVICE FOR GOVERNORS
Original Filed Oct. 2, 1940

INVENTOR
Nelson R. Richmond
BY Harris G. Luther
ATTORNEY

Patented Jan. 17, 1950

2,494,630

UNITED STATES PATENT OFFICE 2,494,630

AUTOMATIC RESETTING DEVICE FOR GOVERNORS

Nelson R. Richmond, Thompsonville, Conn., assignor to United Aircraft Corporation, East Hartford, Conn., a corporation of Delaware Original application October 2, 1940, Serial No. 359,370. Divided and this application January 26, 1944, Serial No. 519,799

7 Claims. (Cl. 170—160.19)

1

This application is a division of U. S. application Serial No. 359,370, filed October 2, 1940 (Patent No. 2,352,736, dated July 4, 1944).

This invention relates to improvements in governing devices and has particular reference to an improved governor control for a controllable-pitch propeller.

An object of the invention resides in the provision of an improved governor control of the character indicated having a manually actuatable setting device and an automatic setting device for resetting the governor for operating conditions under which the manual setting device does not provide adequate control and for returning the governor to the manual setting when such special operating conditions terminate.

A somewhat more specific object resides in the provision in a governor for a controllable-pitch propeller of means for automatically resetting the governor for propeller speeds below a predetermined minimum to prevent the propeller from attaining a speed materially above the speed for which the governor is normally set as the speed of the propeller is increased.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for the purpose of illustration only and is not to be taken as limiting or restricting the invention since it will be apparent to those skilled in the art that various changes in the illustrated construction may be resorted to without in any way exceeding the scope of the invention.

In the drawing, Fig. 1 is a longitudinal sectional view through a governor constructed according to the invention.

Figure 2:
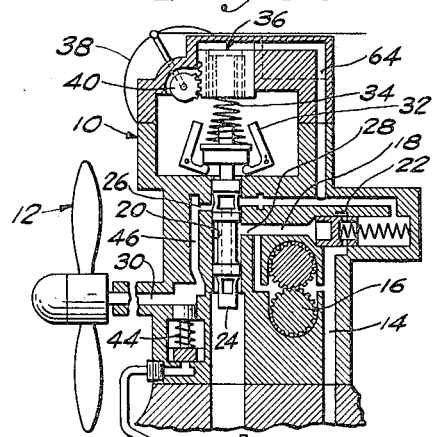
Figure 3:
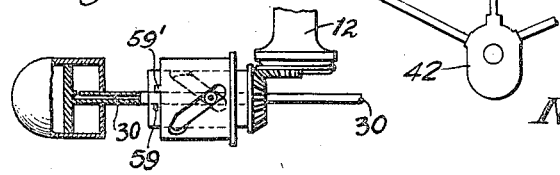

Fig. 2 is a schematic sectional view showing the governor applied to control the pitch of a controllable-pitch propeller, and Fig. 3 is a schematic view of the pitch changing mechanism.

Referring to the drawing in detail, the numeral 10 generally indicates the speed governor and the numeral 12 generally indicates a controllable-pitch propeller the pitch of which is regulated by the action of the governor 10. In the illustrated arrangement the governor actuates a valve for controlling the pitch of a hydro-controllable feathering-type propeller one illustrative form of which is clearly illustrated and described in

2

United States Patent No. 2,174,717, issued October 3, 1939, to Frank W. Caldwell et al., for Multiposition controllable pitch propeller.

It is well known to operate a controllable-pitch propeller under governor control to establish a substantially constant engine speed by changing the propeller pitch to vary the load on the engine whenever the engine tends to speed up or slow down. It is also well known to manually adjust the governor setting so that the propeller will maintain the engine speed substantially constant at a selected rate.

In the hydro-controllable propeller and control system illustrated in Fig. 2, hydraulic fluid, such as engine lubricating oil at lubricating oil pressure, is supplied through the channel 14 to the intake of a booster pump 16. The outlet of the pump is connected with a pressure chamber 18 one end of which leads into a valve bore 20 and the other end of which leads to a pressure relief valve 22 which is operative to maintain a predetermined fluid pressure in the chamber 18 or to maintain the fluid pressure in the chamber 18 a predetermined amount above the fluid pressure required to operate the propeller. A valve plunger 24 is slidable in the bore 20 and controls the ports 26 and 28 in such a manner that the propeller line 30 may be connected with the pressure chamber 18 or may be vented to drain through the hollow plunger 24 and the lower end of the bore 20. At its upper end the plunger 24 is operatively connected to a speed governor having centrifugally actuated flyballs 32 opposed by a speeder spring 34. The upper end of the speeder spring rests against the lower end of a movable abutment 36 which is adjustable to various positions by the manually actuatable mechanism including the pulley 38 and pinion 40 the teeth of which mesh with rack teeth provided on one side of the movable abutment. By rotating the pulley 38 the lowermost operative position of the abutment 36 and the load on the speeder spring 34 can be changed to change the speed setting of the governor. If desired the propeller 12 may be of the feathering type and the unfeathering operations may be controlled by the high pressure pump 42 connected to the propeller line 30 through the pressure operated cut-off valve 44 which acts to cut-off the connection 46 between the governor operated valve and the propeller whenever the high pressure pump 42 is operated and simultaneously connect the outlet of the high pressure pump directly with the propeller line 30.

The governor setting mechanism may be adjusted for a selected engine speed and will then maintain the engine at or near the selected speed by varying the propeller pitch as long as the engine develops sufficient power to rotate the propeller at the selected speed. If, however, the engine is brought to an idling condition for some particular maneuver, such as a dive or a landing glide, it will not develop sufficient power to maintain the speed for which the governor is set. The governor will then change the propeller pitch setting in an attempt to reduce the engine load sufficiently to maintain the selected speed and will maintain the propeller in this flat pitch condition as long as the engine power remains insufficient to rotate the propeller at the selected speed. If, with the engine at reduced power and the propeller in its flat pitch condition, the engine power is increased, the propeller pitch will not be changed until the engine speed begins to exceed the speed for which the governor is set. As soon as the selected speed is reached the governor will immediately begin to function to increase the propeller pitch and increase the load on the engine to maintain the selected speed. However, as an appreciable time interval is required for the governor to change the propeller pitch from the flat or extreme low pitch condition to a pitch angle sufficient to slow down the engine, during this interval the engine speed may go considerably beyond the speed for which the governor is set and, if the engine power is increased rapidly, this overshooting or overspeeding of the propeller may reach dangerous proportions before the governor control can increase the propeller pitch a sufficient amount to slow down the engine. It is among the objects of the present invention to incorporate into a propeller speed control device of the character indicated suitable means for preventing this overspeeding of the propeller incident to a rapid increase in engine power from a power value below that necessary to drive the propeller at the speed for which the speed controlling governor is set and one illustrative form of such a device is particularly shown in Fig. 1.

The abutment 36 is formed in two parts, as indicated at 48 and 50. Of these the outer part 48 is in the form of a sleeve slidable in the bore of the cylinder 52 formed on the governor cap 54 immediately over the upper end of the spring 34. This sleeve has rack teeth 56 along one side thereof meshing with the teeth of the adjusting pinion 40 and is provided at its lower end with a stop in the form of an internal flange or inset 58. A piston 60 is slidable in the sleeve 48 and in the upper reduced portion of the bore of the cylinder 52 and carries in its lower end an adjustable spring seat 62. With the propeller under the control of the governor the lower end of piston 60 rests against the internal flange 58. A fluid connection 64 leads from the propeller-connected oil chamber 46 to the space at the closed end of the cylinder 52 on top of the piston 60, so that oil at propeller oil pressure is supplied to the cylinder to urge the piston 60 downwardly relative to the sleeve 48 against the stop 58.

When the plunger 24 is in position to connect the ports 28 and 26 the oil pressure in the chamber 46 will be the same as that in the pump outlet chamber 18 and when the plunger 24 is in position to vent the port 26 through the hollow plunger 24 the pressure in the chamber 46 will be the pressure exerted on the oil in the propeller line by the centrifugal action of the propeller blades tending to turn towards their low pitch position. It is only when the propeller blades are against the low pitch limit stops 59, 59' that no fluid pressure will be present in the chamber 46 and under these circumstances the piston 60 may rise to relieve the load on the governor speeder spring 34.

Assuming that the engine power has been reduced so that the engine is no longer able to rotate the propeller at the speed for which the governor is manually set and that, in its effort to relieve the engine load and maintain the selected speed, the governor has maintained the plunger 24 in a position to vent the propeller line through the port 26 until stops 59, 59' operate to prevent further pitch reduction and no pressure is left in the propeller line and the chamber 46, the piston 60 will then rise in the cylinder 52 and leave the stop 58 at the same time relieving the load on the speeder spring 34 and setting the governor for a much lower speed than that for which it was set by the manual control. For instance we might assume that the manual adjustment is set for 2,000 revolutions per minute and when the piston 60 is at the closed end of the cylinder 52 the setting is for 1,000 revolution per minute. If now the engine power is increased and the engine and propeller begin to speed up, the pump 16 will begin to force oil into the outlet chamber 18 and as soon as the speed has reached 1,000 R. P. M. the governor will act to connect the ports 28 and 26 to admit oil to the propeller pitch changing mechanism through passages 46 and 30 to start increasing the propeller pitch. As the oil pressure in the propeller line 30 builds up, this pressure will be transmitted through conduit 64 to the top of the piston 60 and will begin to change the governor setting. We will thus have a condition in which the propeller pitch is being increased to retard the engine speed and the governor setting is being changed toward a higher speed setting at the same time. With properly proportioned parts and fluid connections the piston will reach the stop 58 at somewhere near the same time that the engine speed reaches the speed at which the governor is set. Since the propeller mechanism is full of oil at this time and the propeller pitch has already been increased to bring the engine and propeller speeds under control of the governor at the gradually increasing speed setting, when the engine and propeller speed reaches the speed for which the governor is set the governor will already be in control of the propeller pitch and the speed will be quickly brought to the speed for which the governor is set with substantially no overspeeding of the propeller at this period. As long as the power developed by the engine is sufficient to drive the propeller at the speed for which the governor is set there will be sufficient oil pressure on top of the piston 60 to maintain the piston in contact with the stop 58 and the speed setting of the governor will remain that at which the governor is set by the manual adjusting mechanism.

While a particular mechanical arrangement has been hereinabove described and illustrated in the accompanying drawing for the purpose of disclosing the invention, it is to be understood that the invention is not limited to the particular construction so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In combination, a propeller having pitch changing mechanism, a low pitch stop, a governor having a spring and a valve, and centrifugal weights balanced against said spring and connected to move said valve for controlling the application of pressure fluid to and the draining of fluid from the pitch changing mechanism of said propeller, a two part abutment for the spring, one part of which is manually adjustable during operation of the propeller and acts as a stop for the other part, said other part serving as an abutment for said spring and being hydraulically actuated and held against said abutment stop by the hydraulic pressure in said pitch changing mechanism, but movable by the governor spring to another position upon failure of the hydraulic pressure in said pitch changing mechanism due to movement of the propeller against said low pitch stop.

2. In combination with a controllable pitch propeller having an hydraulically actuated pitch changing mechanism and means defining a low pitch position, a source of hydraulic fluid under pressure for operating said pitch changing mechanism, a speed responsive governor, governor speed selecting means having a range of normal speed settings, and a valve operated by said governor for connecting said pitch changing mechanism with said source to change the propeller pitch in one direction and for connecting said pitch changing mechanism with drain to change the propeller pitch in the other direction, hydraulically-actuated mechanism responsive to the hydraulic pressure in said pitch changing mechanism for automatically changing the speed setting of said governor and having one position in which the governor setting is below said range of normal speed settings, and a continuously-open liquid-conducting conduit connecting said pitch changing mechanism and said hydraulically-actuated governor speed setting mechanism.

3. In combination with a propeller having hydraulically actuated pitch changing means in which hydraulic fluid under pressure is introduced to said pitch changing means to change the pitch in one direction, a governor controlling the introduction of said fluid, governor speed selecting means including hydraulically actuated means responsive to the hydraulic pressure in said pitch changing means for changing the speed setting of the governor, and means continuously hydraulically connecting said propeller pitch changing means and said hydraulically actuated speed setting means to drain fluid from said hydraulically actuated speed setting means upon failure of the pressure in said pitch changing means.

4. In combination with a controllable pitch propeller having pitch changing means in which hydraulic fluid under pressure is introduced to said propeller pitch changing means to increase the propeller pitch, and fluid is drained from said propeller pitch changing means to decrease the propeller pitch, said propeller being continuously urged toward low pitch position incident to rotation thereof, a governor controlling the introduction and draining of said fluid, governor speed selecting means including hydraulically actuated means responsive to the pressure of pitch changing hydraulic fluid being introduced to or drained from said propeller pitch changing means for changing the speed setting of said governor, and a conduit continuously hydraulically connecting the propeller side of said governor, said pitch changing means and said speed setting means to drain said hydraulically actuated means to reset the governor to a lower speed value upon failure of the pitch changing hydraulic fluid pressure in said propeller pitch changing means.

5. In combination with a controllable pitch propeller having a hydraulically-actuated pitch-changing mechanism and means defining a low pitch position, said propeller being continuously urged toward said low pitch position incident to rotation thereof, a source of hydraulic fluid under pressure for operating said pitch changing mechanism, said pitch changing mechanism being operable to increase the propeller pitch by application of said hydraulic fluid to said pitch changing mechanism and to decrease said propeller pitch by draining hydraulic fluid from said pitch changing mechanism, a speed responsive governor having a range of normal speed settings, and a valve operated by said governor for controlling application of said hydraulic fluid to and the draining of said hydraulic fluid from said pitch changing mechanism, governor speed setting means having a range of normal speed settings and a speed setting below said range, hydraulically-actuated mechanism operatively connected with said speed setting means and responsive to the pressure of the hydraulic fluid in said pitch changing mechanism for changing the speed setting of said governor between a setting below said range of normal speed settings and a normal speed setting, and continuously open fluid conducting means interconnecting said valve, said hydraulically-actuated governor setting mechanism and said hydraulically-actuated pitch-changing mechanism.

6. A propeller pitch controlling mechanism comprising, a fluid actuated pitch changing motor, a speed responsive governor for controlling the application of fluid pressure to said motor to reduce the speed of the propeller by increasing its pitch and for controlling the draining of fluid from said motor to increase the speed of the propeller by reducing its pitch, a speeder spring for said governor, means for determining the speed setting of the governor by locating the operating position of the speeder spring, said means including fluid operated means, responsive to the fluid pressure in said motor, operably connected with said motor by fluid conducting means for holding said speeder spring in its operating position when the fluid in said motor is under pressure but movable to another position by the speeder spring to reset the governor for a lower speed upon failure of the pressure of the fluid in said fluid operated means due to failure of the pressure of the fluid in said motor and comprising a cylinder hydraulically connected with said motor and a piston reciprocable in said cylinder and operably associated with said governor speeder spring.

7. A propeller pitch controlling mechanism comprising, a fluid actuated pitch changing motor, a speed responsive governor for controlling the application of fluid pressure to said motor to reduce the speed of the propeller by increasing its pitch and for controlling the draining of fluid from said motor to increase the speed of the propeller by reducing its pitch, a speeder spring for said governor, means for determining the speed setting of the governor and locating the operating position of said speeder spring, said means including a movable abutment for said spring, means for manually adjusting said abutment during operation of the propeller, a fluid actuated expansible chamber device for moving said abutment, and a continuously open fluid conducting conduit continuously operatively connecting said expansible chamber device with said motor for supplying operating fluid to said device.

NELSON R. RICHMOND.

REFERENCES CITED

The following references are of record in the file of this patent:

UNITED STATES PATENTS

| Number | Name | Date |
|---|---|---|
| 2,137,689 | Karelitz | Nov. 22, 1938 |
| 2,174,717 | Caldwell et al. | Oct. 3, 1939 |
| 2,227,593 | Lawrence | Jan. 7, 1941 |
| 2,260,469 | Martin | Oct. 28, 1941 |
| 2,261,145 | Dickey | Nov. 4, 1941 |
| 2,343,382 | Martin | Mar. 7, 1944 |
| 2,352,736 | Richmond | July 4, 1944 |

FOREIGN PATENTS

| Number | Country | Date |
|---|---|---|
| 820,653 | France | Nov. 6, 1937 |